United States Patent [19]
Ishi

[11] Patent Number: 4,800,561
[45] Date of Patent: Jan. 24, 1989

[54] SYNCHRONIZATION BURST TRANSMIT PHASE CONTROL SYSTEM

[75] Inventor: Yuuhei Ishi, Tokyo, Japan

[73] Assignee: NEC Corporation, Japan

[21] Appl. No.: 87,662

[22] Filed: Aug. 20, 1987

[30] Foreign Application Priority Data

Aug. 27, 1986 [JP] Japan ................................. 61-199038

[51] Int. Cl.$^4$ .............................................. H04J 3/06
[52] U.S. Cl. .................................................. 370/104
[58] Field of Search ................. 370/104; 375/106, 114

[56] References Cited

U.S. PATENT DOCUMENTS

| | | | |
|---|---|---|---|
| 3,995,111 | 11/1976 | Tsuji et al. | 375/109 |
| 4,602,375 | 7/1986 | Inukai | 370/104 |
| 4,686,673 | 8/1987 | Hotta | 370/104 |

OTHER PUBLICATIONS

AIAA Paper No. 72-545 Entitled *Synchronization of Earth Stations to Satellite-Switched Sequences*, by R. A. Rapuano and N. Shimasaki.

Primary Examiner—Douglas W. Olms
Assistant Examiner—Min Jung
Attorney, Agent, or Firm—Laff, Whitesel, Conte & Saret

[57] ABSTRACT

A synchronization system maintains the accuracy of time frame synchronization in an earth satellite time division multiple access system. Two metric patterns are provided for giving synchronization accuracy. The system selects one pattern, compares accuracy with threshold values. If the comparison shows less than threshold accuracy, the system switches to the other pattern.

8 Claims, 3 Drawing Sheets

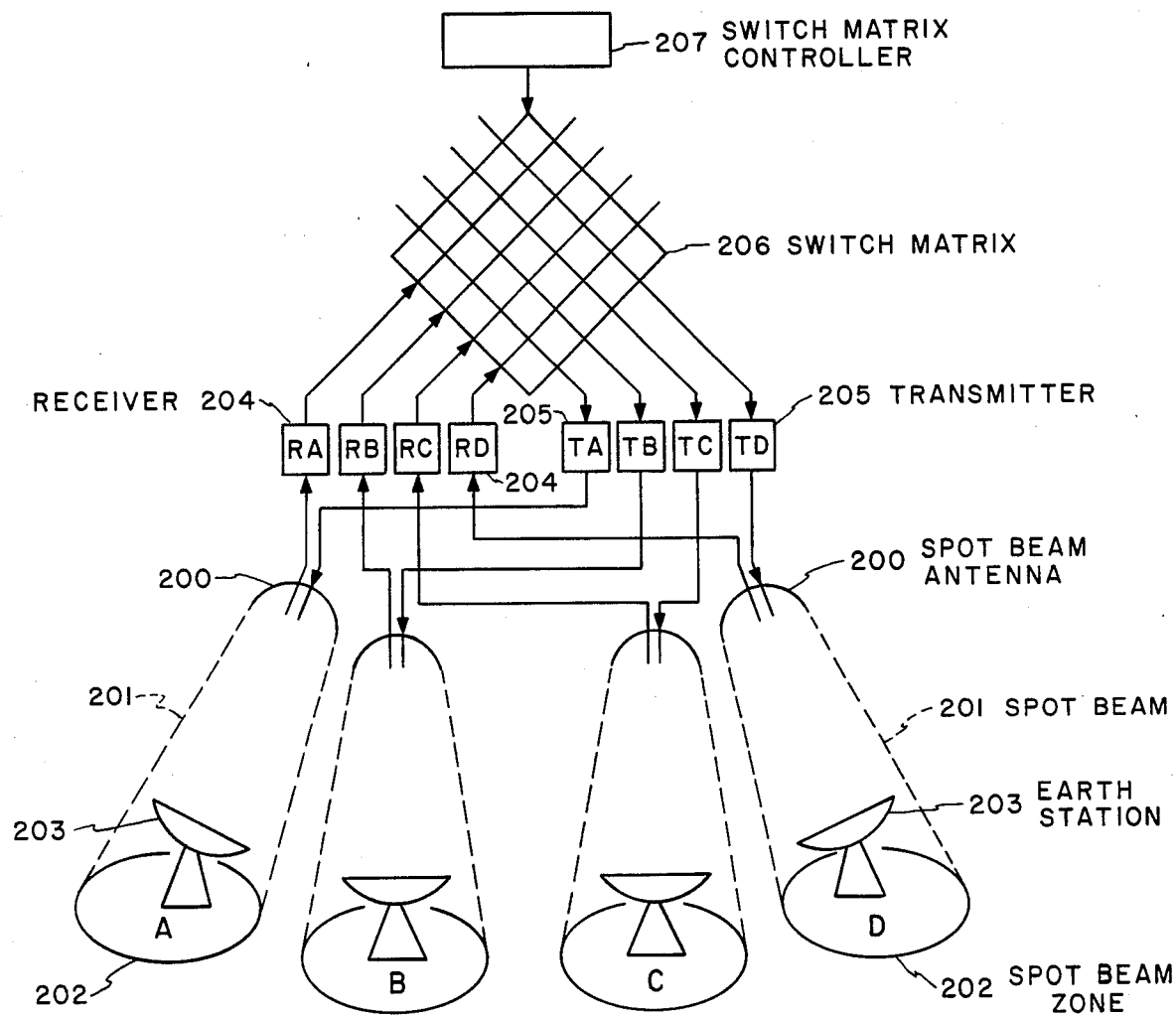
FIG. 1
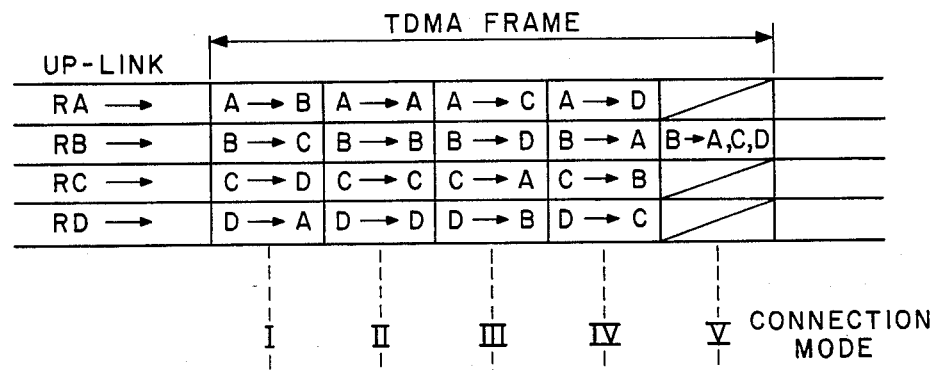
FIG. 2A
FIG. 2B

SYNCHRONIZATION BURST TRANSMIT PHASE CONTROL SYSTEM

BACKGROUND OF THE INVENTION

The present invention relates to a transmit phase control system of synchronization burst (hereinafter abbreviated as "sync burst") and, more particularly, to a sync burst transmit phase control system for establishing and maintaining a TDMA (Time Division Multiple Access) frame between a plurality of earth stations which are capable of communicating with each other via a communications "satellite based on an SS/TDMA (Satellite-Switched Time Division Multiple Access") system.

An SS/TDMA system, among others, is a promissing implementation for satellite communications which allows a plurality of earth stations to hold communications by way of a large capacity satellite. The SS/TDMA system is constituted by a communications satellite which is provided with a switch matrix, a switch matrix controller and a plurality of spot antennas, and a plurality of earth stations. Each of the spot antennas emits a spot beam for irradiating a limited beam spot zone on the surface of the earth, and receives an electromagnetic wave which is radiated from an earth station located in a beam spot area. The switch matrix controller controls the switching of the switch matrix to allow any earth stations to hold a communication between themselves. Since the switching of the switch matrix is performed on the basis of a timing reference which is generated by the switch matrix controller of the satellite, each earth station has to synchronize its own timing reference to the satellite onboard timing reference. The transmit phase control of a sync burst is adapted to implement such synchronization. A method of controlling sync burst transmit phase is disclosed in, for example, European Patent Application No. A₂ 0 152 108 laid open for public inspection on Aug. 21, 1985. A problem with the method disclosed in this European application is that a metric pattern included in a sync burst is selected unalterably. The metric pattern is not always optimum, depending upon the adjustment of a demodulator which is built in the earth station. A result is the lowering of the accuracy of the transmit phase control.

SUMMARY OF THE INVENTION

It is, therefore, an object of the present invention to provide a sync burst transmit phase control system which is free from the drawback particular to the prior art system as discussed above.

A sync burst transmit phase control system of the present invention is characterized in that a metric pattern included in a sync burst is replacable with another metric pattern in order to select a metric pattern for realizing the ultimate synchronization accuracy at any moment, with no regard to the adjustment condition of a demodulator and other external conditions. Specifically, the sync burst transmit phase control system includes means for averaging transmit phase correction values, when a synchronization control operation is performed by using one of two different patterns (e.g. pattern I) for the metric pattern. These averaged values are necessary for maintaining synchronization, over a predetermined period of time so as to determine synchronization accuracy particular to the pattern I. Then, by comparing that synchronization accuracy with synchronization accuracy particular to the other pattern (e.g. pattern II) which is determined by applying the same processing to the pattern II, one of the patterns I and II is selected as an optimum metric pattern which is higher in synchronization accuracy than the other. At a predetermined period, the control system decides whether or not an instantaneous synchronization accuracy is lower than synchronization accuracy which is defined as a predetermined threshold value. Synchronization accuracy immediately before the last switching and an the current synchronization accuracy are constantly compared. When it is decided that higher synchronization accuracy is obtainable with the pattern which is other than the currently used pattern, the pattern is switched. When the current synchronization accuracy is lower than the threshold accuracy, the degrees of synchronization accuracy particular to the metric patterns I and II are compared to select one of them which is higher in synchronization accuracy than the other.

BRIEF DESCRIPTION OF THE DRAWINGS

The above and other objects, features and advantages of the present invention will become more apparent from the following detailed description taken with the accompanying drawings in which:

FIG. 1 is a schematic view showing the principle of an SS/TDMA system;

FIGS. 2A and 2B are charts showing connection modes of a satellite born switch matrix;

DESCRIPTION OF THE PREFERRED EMBODIMENT

Figure 3:
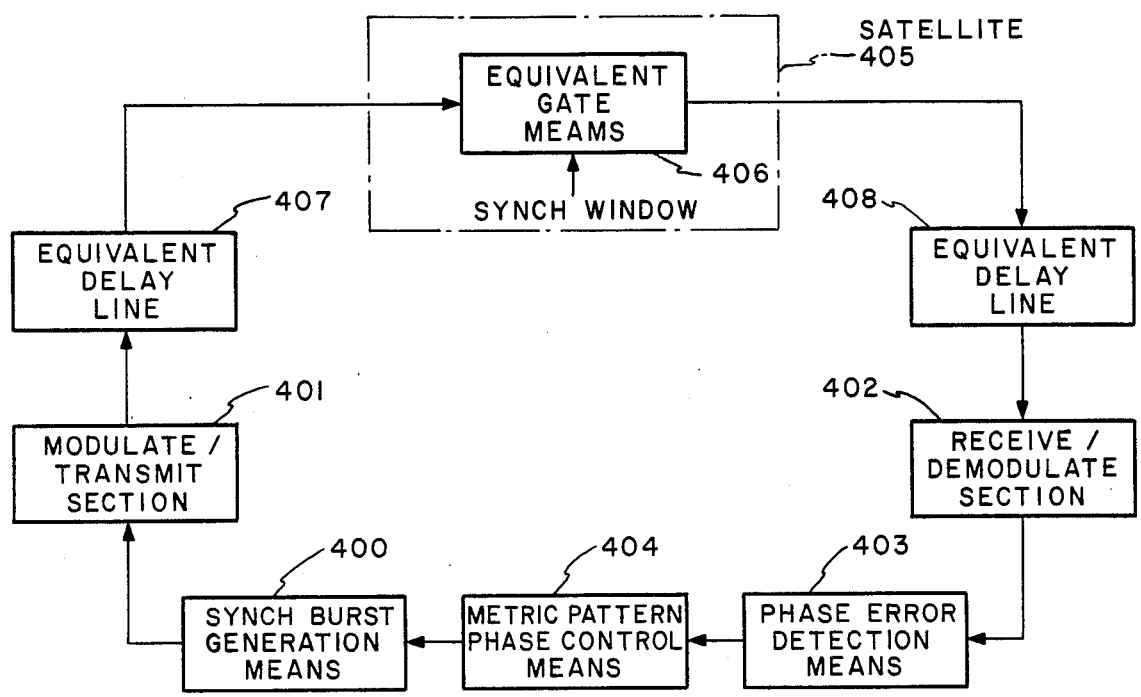
FIG. 3 is a schematic block diagram of a prior art sync burst transmit phase control system.

To facilitate an understanding of the present invention, a brief reference will be made to an SS/TDMA system, shown in FIG. 1. Specifically, FIG. 1 shows a relationship between a repeater built in to a communications satellite and earth stations. As shown, a plurality of spot beam antennas 200, four antennas in this embodiment, are mounted on the satellite and individually shared for both transmission and reception. Each spot beam antenna 200 generates a relatively narrow spot beam 201 to irradiate a limited spot beam zone 202 on the earth (A, B, C or D), while receiving an electromagnetic wave radiated from an earth station 203 which is located in the zone A, B, C or D.

Due to the use of spot beams as described above, the SS/TDMA system increases the gain of the satellite antennas and, thereby, effectively increases the radiation power. In addition, if the beam spot zones are sufficiently remote from each other and share the same frequency, the SS/TDMA system implements an ideal communication system from the viewpoint of frequency reuse, as well.

Each antenna 200 may be replaced by a pair of antennas, i.e., an antenna adapted for an up-link which extends from an earth station to a satellite, and an antenna adapted for a down-link which extends from the satellite to the earth station. In such a case, one antenna may radiate a relatively narrow spot beam and the other, a beam which is wider than the spot beam. For the sake of simplicity, however, let the discussion to be continued assuming the specific construction of FIG. 1.

While each beam spot zone 202 is shown to include a single earth station 203, in practice, it may include a plurality of earth stations. Electromagnetic waves radiated from the earth stations in the zones 202 are individually received by the antennas 200 and, then, amplified by receivers 204 which are labeled RA, RB, RC and RD. On the other hand, signals to be radiated from the antennas 200 are individually fed from transmitters (TA, TB, TC and TD) 205.

A switch matrix 206 is provided for selectively connecting the up-links and the downlinks. Matrix 206 is controlled by a switch matrix controller 207. The position of the switch matrix is determined by a connection mode which is indicative of a combination of up-links and down-links which are to be interconnected. Specifically, the switch matrix 206 sequentially selects a plurality of connection modes based on a predetermined time schedule, thereby cyclically connecting the up-links and down-links. Generally, the connection modes include a mode in which a signal on a single up-link is applied to all the down-links. Exemplary connection modes are shown in FIG. 2.

In FIGS. 2A and 2B, there are shown five different connections modes I, II, III, IV and V which are cyclically set up. FIG. 2A shows the down-links, individually corresponding to particular zones, to which the signals from the respective zones are connected, as seen from the receivers RA, RB, RC and RD of the up-links. FIG. 2B shows the up-links individually corresponding to particular zones from which the signals are to be radiated toward the respective zones, as seen from the transmitters TA, TB, TC and TD of the down-links.

Hence, the respective zones are periodically and intermittently connected to each other. Such a communications system which is mediated by a communications satellite is limited to the TDMA system. The repetition frequency of the previously mentioned connection modes corresponds to a TDMA frame period.

Generally, in a TDMA communications system, one of participant earth stations serves as a reference station and transmits a signal, or reference burst, at the TDMA frame period and according to a timing reference of its own. The other participant earth stations individually receive the reference burst, whereby a timing reference is set up in the communications system.

As regards SS/TDMA, however, the changeover of the connection mode is effected according to a timing reference which is provided in the switch matrix controller 207, as shown in FIG. 1. A prerequisite is, therefore, that the reference station first synchronizes its own timing reference to that on the satellite. It is to be noted that, since the distance between the reference station and a satellite changes every moment, even if the satellite is stationary, the word "synchronize" as used above implies that the reference station controls its own timing reference such that a signal transmitted according to the timing reference of the reference station is synchronized to the timing reference of a satellite.

A sync burst transmit phase control system is an implementation designed to meet the above requisite, i.e., to set up and maintain a TDMA frame. In order that the reference station may synchronize its own timing reference to the timing of a satellite, a particular one of the connection modes is used, as shown in FIG. 2 which allows a sync burst transmitted by the reference station to be received in its own zone.

Referring to FIG. 3, essential sections of a prior art system is shown. As shown, a reference earth station includes a sync burst generating means 400, a modulating and transmitting section 401, a receiving and demodulating section 402, a phase error detecting means 403, and a metric pattern phase control means 404. A communications satellite 405, on the other hand, is provided with an equivalent gate means 406. Equivalent delay lines 407 and 408 are provided on the propagation paths which correspond to an up-link and a down-link, respectively.

Figure 4A:
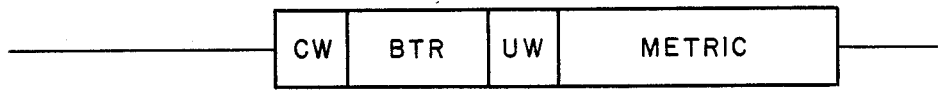
FIGS. 4A to 4C schematically show, respectively, a sync burst in a transmit mode, a sync window, and a sync burst in a receive mode.

The sync burst generating means 400 generates a predetermined sync burst based on a reference time signal which is produced in the reference station. The sync burst is fed to the equivalent gate means 406 via the modulating and transmitting section 401 and equivalent delay line 407. In the equivalent gate means 406, the sync burst is gated by a sync window which is generated on the basis of a reference time signal of the satellite. The gated sync burst is returned to the reference station over the equivalent delay line 408. If a PSK (Phase Shift Keying) or similar common modulation system is used for modulating a carrier wave, the sync burst may be provided with a format shown in FIG. 4A. The specific format of FIG. 4A includes a preamble which consists of a non-modulated carrier wave portion (Continuous Wave (CW)), adapted for the separation of the carrier wave at a receive station, and a portion modulated by a predetermined signal code (Bit Timing Recovery (BTR)). The preamble is followed by a portion modulated by a predetermined sync signal (Unique Word (UW)), and a metric pattern (METRIC) comprising a predetermined signal code for measuring a time phase error with respect to the time reference of the satellite.

Figure 4B:

As long as the sync burst transmit phase control system is in a normal operating condition, a sync burst is returned to a reference station over the equivalent delay line 408, as mentioned earlier. At the receiving station, the returned signal is routed to the receiving and demodulating section 402 with the latter half of the metric pattern gated off at a trailing edge 500 of a sync window, which is shown in FIG. 4B. The sync window is generated on the basis of the time reference of the satellite. The receiving and demodulating section 402 demodulates the input sync burst by two-phase, four-phase or multi-phase PSK phase demodulation. The sync burst now constituted by the unique word and the metric pattern whose latter half has been gated off at a time position 501, as indicated by solid lines in FIG. 4C. This sync burst is applied to the phase error detecting means 403.

Figure 4C:
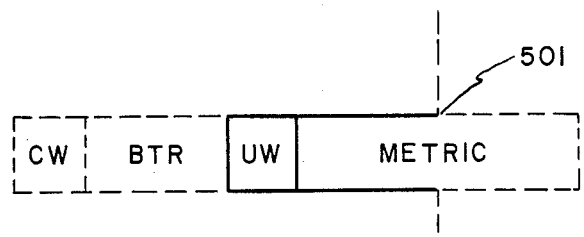

The phase error detecting means 403 detects the trailing edge 500 of the window, FIG. 4B, and the time position 501 of the trailing edge of the metric pattern of the sync burst, FIG. 4C, which corresponds to the trailing edge portion 500. This detection determines a difference between the time position 501 and a reference time position which is defined at the center of a metric pattern. The output of the phase error detecting means 403 is a phase error signal in a sync burst transmit phase control system. This phase error signal is routed through the metric pattern phase control means 404 to the sync burst generating means 400 so as to control the phase of a sync burst, which is to be generated by the generating means 400.

The above procedure is repeated thereafter by the closed loop of FIG. 3. Specifically, the phase of the sync burst is controlled until the phase error signal generated by the phase error detecting means 403 becomes zero, whereby a TDMA frame which is synchronous with the sync window of the satellite is established and maintained. It is to be noted that the phase control in the sync burst generating means 400 may be implemented with a voltage control oscillator or a frequency divider.

For the sync burst transmit phase control system, a reference may be made to R. A. RAPUANO and N. SHIMASAKI "SYNCHRONIZATION OF EARTH STATIONS TO SATELLITE-SWITCHED SEQUENCES," AIAA 4TH COMMUNICATIONS SATELLITE SYSTEMS CONFERENCE, AIAA Paper No. 72-545, APRIL 1972, as well as to the two previously mentioned patents. As regards the detection of the time position 501 (FIG. 4C) of the metric pattern, an uncertain time zone occurs in the time position due to an error factor which is ascribable to the signal-to-noise (S/N) ratio of the transmission system which includes the up- and down-links, the wave-form characteristic at the trailing edge 500 of the sync window, FIG. 4B, and others.

When the latter half of a metric pattern is lost due to the sync window, that which appears on the output of a demodulator is, ideally, a random pattern or, generally, "000 ...," "111 ... " or a like pattern, depending upon the adjustment condition of the demodulator. It follows that the particular pattern in the metric region has to be implemented with a pattern which is readily distinguishable over the above-stated pattern. Usually, such a metric pattern is unalterably determined by experiments.

To eliminate the positional uncertainty at the trailing edge 500 of the sync burst, FIG. 4B, it has been customary to store predetermined metric patterns, each pattern constituting a part of a sync burst by a predetermined number n of measurements. Then, the stored patterns are compared with a predetermined metric pattern on a symbol-by-symbol basis. Then, the results of the comparison are integrated on a symbol-by-symbol basis after, if necessary, converting them into predetermined weighting coefficients for the correction of an error generation characteristic of a transmission path. Next, the symbol-by-symbol integrated values are compared with a predetermined reference level, thereby determining a symbol length of a metric pattern.

A problem with the prior art system described above is that since a metric pattern in a sync burst is unalterably determined, the metric pattern is not always optinum depending upon the adjustment condition of a demodulator. Especially, in reference stations of SS/TDMA satellite communications systems or like apparatus which need particularly high reliability and, therefore, usually adopt a duplex construction, the demodulators of the individual apparatus are rarely adjusted to the same condition. Further, when a demodulator is replaced for maintenance, the new demodulators is not necessarily optimumly conditioned for a metric pattern used. In practice, therefore, an extra mechanism for reducing, if a little, the inadequateness of a metric pattern due to the adjustment condition of a demodulator and other external factors is indispensable.

This is the most serious problem with the SS/TDMA satellite communications system.

Figure 5:
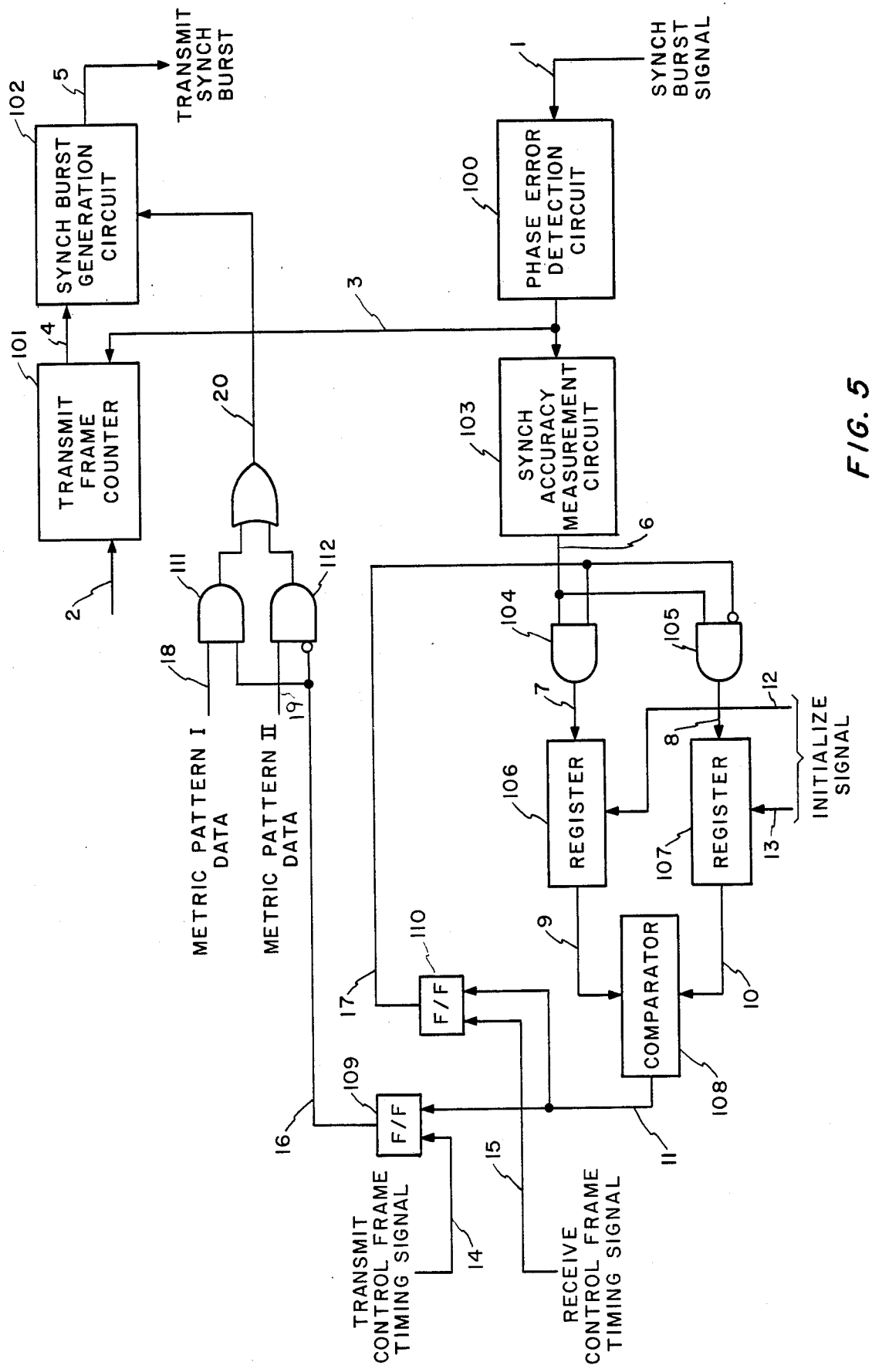
FIG. 5 is a block diagram of a synchronization controller which is installed in a reference earth station and representative of a preferred embodiment of the present invention.

FIG. 5 shows a function block diagram of a synchronization control section of a reference station which is representative of one embodiment of the present invention. As shown, a sync burst signal is received demodulated, and fed to a position error detection circuit 100 on a TDMA frame basis. When the position error detector circuit 100 has detected any positional error, it applies to the sync burst signal 1 an operation for reducing the ambiquity of position error detection. Then, the circuit 100 applies phase correction data 3 to a transmit frame counter 101 which is counting TDMA frames clocked by a system clock 2, for the purpose of correcting the transmit phase of a sync burst. In response, the transmit frame counter 101 delivers a sync burst generation timing signal 4 to a sync burst generation circuit 102. Timed to this timing signal 4, the sync burst generation circuit 102 generates a transmit sync burst signal 5 which is then fed to a modulator, to be transmitted as a sync burst. The phase correction data 3 is also routed to a sync accuracy measurement circuit 103, whereby the circuit 103 is caused to deliver sync accuracy data 6 to gates 104 and 105, at a predetermined period.

A register 106 is adapted to store sync accuracy data 7 when one pattern I is used for a metric pattern which is included in the sync burst. A register 107 is adapted to store sync accuracy data 8 when the other pattern II is used. Hence, the gates 104 and 105 serve to select the sync accuracy data 6 when use is made of the patterns I and II, respectively. The outputs 9 and 10 of the registers 106 and 107, respectively, are applied to a comparator 108. The output 11 of the comparator 108 becomes (logical) "0" when the accuracy value 9 associated with the pattern I is smaller than the accuracy value 10 associated with the pattern II.

First, each of the registers 106 and 107 is initialized to a sync accuracy value which is defined as a predetermined threshold value, by an initializing signal 12 or 13, as shown in the figure. In such an initial condition, the outputs 9 and 10 of the registers 106 and 107, respectively, are equal to each other and, therefore, the output 11 of the comparator 108 is (logical) "1". This output 11 is applied to data input terminals of flip-flops (F/Fs) 109 and 110 which are adapted for retiming.

A transmit control frame timing signal 14 has a period which is an integral multiple of a predetermined TDMA frame. The signal at 14 is fed to a clock input terminal of the F/F 109. A receive control frame timing signal 15 corresponding to the signal 14 is applied to a clock input terminal of the F/F 110. Initially, therefore, the outputs 16 and 17 of the F/Fs 109 and 110, respectively, are "1" each. The F/F output 16 is delivered to pattern selection gates 111 and 112 to which are fed, respectively, metric pattern I data 18 and metric pattern II data 19, whereby the metric pattern I data is selected.

The selected metric pattern I data is fed via an OR gate 113 to the sync burst generation circuit 102 as a metric pattern data signal 20, which is to be included in a sync burst to be transmitted. On the other hand, the F/F output 17 is fed to the gates 104 and 105. In this case, the sync accuracy data 6 is applied to the register 106. Specifically, in the initial condition, the metric pattern I data 18 is used for the metric pattern which is included in the sync burst. The sync accuracy data 7 which is the result of synchronization control as performed for a predetermined period of time with the metric pattern I is stored in the register 106, as stated earlier. Stored in the other register 107 is the predetermined threshold value. Hence, if the synchronization accuracy value produced by performing synchronization control with the metric pattern I is larger than the threshold value, the output 11 of the comparator 108 remains "1". Therefore the metric pattern I is used continuously. If the synchronization accuracy value is smaller than the threshold value, the output of the comparator 108 turns into "0". As a result, the metric pattern included in the transmit sync burst is replaced with the metric pattern II data 19 timed to the transmit control frame.

Likewise, the gate signal 17 fed to the synchronization accuracy data selecting gates 104 and 105 is changed to "0" and is timed to the receive control frame timing, to feed to the register 107 the synchronization accuracy value 8 which is associated with the metric pattern II. The synchronization accuracy value 8, associated with the metric pattern II, is fed to the register 107 and is compared by the comparator 108 with the synchronization accuracy value 9, which occured immediately before the change of metric pattern and which is associated with the metric pattern I. If the value 8 is larger than the value 9, the output 11 of the comparator 108 remains "0".

As previously mentioned, the synchronization accuracy is periodically measured at predetermined intervals. The same mode of operation is continued until the synchronization accuracy becomes lower than the accuracy obtained with the metric pattern I or until a predetermined period of time expires. When the sync accuracy with the metric pattern II becomes lower than the accuracy with the metric pattern I, before the elapse of the predetermined period of time, the metric pattern is changed over to be compared again.

On the other hand, when the sync accuracy obtained with the metric pattern I remains higher than the accuracy obtained with the pattern immediately before the latest changeover of metric pattern, i.e., metric pattern II over a predetermined period of time, the register 107 is initialized to the sync accuracy value which is defined as the predetermined threshold value by the initialize signal 13. Then, the sync accuracy resulted from the metric pattern I is compared with the threshold value by the comparator 108 again.

If the sync accuracy associated with the metric pattern I is higher than the threshold value, the metric pattern I is continuously used. If the metric pattern I is lower than the threshold value, the metric pattern I is replaced with the metric pattern II. Then, the sync accuracy associated with the metric pattern II is compared with the accuracy associated with the previous metric pattern I so as to use the one of the two metric patterns which is higher in sync accuracy than the other pattern.

Likewise, while the metric pattern II is used, the initialize signal 12 is fed to the register 106 at predetermined intervals to initialize the register 106 to the predetermined threshold accuracy. So long as the sync accuracy particular to the metric pattern II is higher than the threshold accuracy, the metric pattern II is continuously used. If the pattern II accuracy is lower than the threshold accuracy, the metric pattern II is replaced with the metric pattern I. Then, the resulting sync accuracy is compared with the accuracy associated with the previous metric pattern II by the comparator 108. If the pattern II accuracy is higher than the threshold, the metric pattern is switched. While the embodiment has been shown and described by using a hardware concept, it can be practiced with ease even by software if use is made of a microprocessor.

As described above, the present invention optimumly switches a metric pattern included in a sync burst so as to match it to particular sync accuracy. This eliminates inadequateness of metric pattern ascribable to the adjustment condition of a demodulator and other external conditions. Therefore, the invention selects a metric pattern which realizes the ultimate sync accuracy to be selected at any moment. Especially, since the sync accuracy being obtained with a current metric pattern is periodically compared with sync accuracy which is defined as a predetermined threshold value, an optimum metric pattern is selected without fail, thus insuring high sync accuracy despite duplex changeover, replacement of a demodulator, etc.

What is claimed is:

1. In an SS/TDMA (Satellite-Switched Time Division Multiple Access) communications system having at least one up-link and one down-link which include a plurality of spot beams, the up- and down-links being sequentially switched according to a predetermined connection mode by a satellite born switch, and the switching of the connection being repeated at a predetermined frame period according to a timing reference provided in a satellite;

a sync burst transmit phase control system in which a predetermined satellite communications reference station for establishing and maintaining a TDM frame between earth stations, which correspond to a plurality of different beam spot zones, comprises:
  means for switching a metric pattern included in a predetermined sync burst which is transmitted to the satellite, said burst being based on a period corresponding to the TDMA frame and, then, said burst is returned from said satellite after being gated off by a sync window which is generated on a basis of a reference time in said satellite and adapted for regulation of the TDMA frame;
  means responsive to a synchronization control operation performed by using a first metric pattern for determining a synchronization accuracy which is obtainable with the first metric pattern by averaging transmit phase correction values, which are necessary for maintaining synchronization, over a predetermined period of time;
  means responsive to a synchronization control operation performed by using a second metric pattern for determining a synchronization accuracy which is obtainable with the second metric pattern by averaging transmit phase corrections, which are necessary for maintaining synchronization, over a predetermined period of time; and
  means for comparing the synchronization accuracy with a predetermined synchronization accuracy at a predetermined period;
  whereby any of the metric patterns is selected which provides a highest synchronization accuracy at a particular moment.

2. A sync burst phase control system for use in a satellite switching time division multiple access (SDMA/SS-TDMA) communication system utilizing a plurality of spot beams corresponding to up and down links in a predetermined connection mode, and a plurality of earth stations intercommunicating via the satellite through a time division multiplexed connection, at least one of the plurality of earth stations being a reference station which establishes and maintains a TDMA frame between earth stations corresponding to the plurality of spot beams, the reference station comprising:

means for switching a metric pattern for transmit phase control included in a predetermined sync burst which is transmitted to the satellite, said burst transmission being based on a period corresponding to the TDMA frame and, then, said burst being returned from said satellite after being gated off by a sync window which is generated on a basis of a reference time in said satellite, said pattern being adapted for regulation of the TDMA frame;

means responsive to a synchronization control operation performed by using a first metric pattern for measuring synchronization accuracy which is obtainable with the first metric pattern;

means responsive to a synchronization control operation performed by using a second metric pattern for measuring synchronization accuracy which is obtainable with the second metric pattern; and means for comparing the synchronization accuracy with a predetermined synchronization accuracy at a predetermined period;

whereby one of the metric patterns is selected which provides a highest synchronization accuracy at a particular moment.

3. A sync burst phase control system for use in a satellite switching time division multiple access (SDMA/SS-TDMA) communication system utilizing a plurality of spot beams corresponding to up and down links and having a communication between said up and down links in a predetermined connection mode, and a plurality of earth stations including a reference station, intercommunicating via said satellite through a time division multiplexed connection, the reference station comprising:

means for transmitting a predetermined sync burst including one of first and second metric patterns to the satellite based on a period corresponding to the TDMA frame and, then, returning said burst from said satellite after being gated off by a sync window which is generated on a basis of a reference time in said satellite, said pattern being adapted for regulation of the TDMA frame;

means responsive to a synchronization phase control operation performed by using the first metric pattern for measuring a synchronization accuracy which is obtainable with the first metric pattern;

means responsive to a synchronization phase control operation performed by using the second metric pattern for measuring synchronization accuracy which is obtainable with the second metric pattern; and means for comparing the synchronization accuracy with a predetermined synchronization accuracy at a predetermined period;

whereby one of the metric patterns is selected which provides a highest synchronization accuracy at a particular moment.

4. A system for enabling a plurality of stations to communicate with each other by synchronized bursts transmitted via satellite, a metric pattern included in each burst, one of said stations being designated a reference station, means for generating two separate metric patterns either one of which may be transmitted with said burst signal for synchronizing said burst signal, means for measuring the synchronization accuracy of a burst including a transmitted one of said metric patterns, and means responsive to said measuring means finding an unacceptable accuracy for switching to the other of said metric patterns.

5. The system of claim 4, wherein said reference station transmits said metric pattern within a synchronized burst signal.

6. The system of claim 5, wherein said sync burst is transmitted based upon a period corresponding to a time division multiple access frame, and means in a satellite for returning said transmitted burst signal during a reference time period determined by said transmitted metric pattern.

7. The system of claim 4 and means for separately measuring the accuracy of synchronization which is available from each of said two metric patterns, and means for selecting the one of said metric patterns which gives the greater accuracy.

8. The system of claim 4 and means for averaging transmit phase corrections for maintaining synchronization with one of said metric patterns, means for comparing the averaged transmit phase corrections with the synchronization accuracy of the other of said metric patterns, and means for selecting the metric pattern with the higher synchronization accuracy.

* * * * *